United States Patent [19]

Alfors

[11] Patent Number: 5,208,532
[45] Date of Patent: May 4, 1993

[54] THROTTLE POSITION SENSOR ADAPTED TO MAINTAIN A FIXED POSITION RELATIVE TO A SHAFT CENTERLINE

[75] Inventor: Eugene D. Alfors, Rockford, Ill.

[73] Assignee: Honeywell Inc., Minneapolis, Minn.

[21] Appl. No.: 860,876

[22] Filed: Mar. 31, 1992

[51] Int. Cl.$^5$ .............. G01B 7/30; G01B 7/14; F02P 5/02

[52] U.S. Cl. .............. 324/207.2; 123/617; 324/207.25

[58] Field of Search .............. 324/173, 174, 207.20, 324/207.21, 207.25; 123/414, 617; 340/671, 672

[56] References Cited

U.S. PATENT DOCUMENTS

| | | | |
|---|---|---|---|
| 3,683,219 | 8/1972 | Kruse | 324/174 X |
| 3,716,121 | 2/1973 | Frigger | 324/174 X |
| 3,818,326 | 6/1974 | Masuda et al. | 324/207.25 X |
| 3,835,373 | 9/1974 | Matula | 338/32 H X |
| 3,893,059 | 7/1975 | Nowak | 338/32 R |
| 3,942,045 | 3/1976 | Palazzetti | 310/155 |
| 4,257,040 | 3/1981 | Shirasaki et al. | 324/174 X |
| 5,017,868 | 5/1991 | Hajzler | 324/207.25 X |

*Primary Examiner*—Gerard R. Strecker
*Attorney, Agent, or Firm*—William D. Lanyi

[57] ABSTRACT

An angular position sensor is provided with a carrier assembly in which a magnetically sensitive device is disposed. The carrier assembly has a portion which is shaped to receive a rotatable member in sliding association therein. A magnet is disposed within the rotatable member and is rotatable in response to rotation of a shaft attached to the rotatable member. A pivot means is provided for permitting the carrier assembly to move relative to a stationary housing and in response to movement of the rotatable member. A means for urging the carrier assembly toward the central axis of the rotatable member is also provided to maintain a consistent relationship between a magnetically sensitive device disposed within the carrier assembly and the magnetic disposed within the rotatable shaft.

20 Claims, 6 Drawing Sheets

THROTTLE POSITION SENSOR ADAPTED TO MAINTAIN A FIXED POSITION RELATIVE TO A SHAFT CENTERLINE

BACKGROUND OF THE INVENTION

1. Field of the Invention

The present invention is generally related to rotary position sensors and, more particularly, to a throttle position sensor which maintains a constant gap between a rotatable magnet and a magnetically sensitive transducer even if the rotational axis of the throttle shaft may move from its original position.

2. Description of the Prior Art

Many different types of position sensors are well known to those skilled in the art. Some position sensors are intended for use in the determination of the angular position of a rotatable shaft. For example, U.S. Pat. No. 4,257,040, which issued to Shirasaki et al on Mar. 17, 1981, discloses an engine rotational information detecting apparatus that provides information which is indicative of the rotation of an engine. A multiplicity of magnetic poles are formed on a track along the circumfrential periphery of a rotating member driven by an engine. This permits the rotational reference position to be detected and a rotational angle to be determined from the rotational reference position of the engine. A reference sensor and an angle sensor are provided for generating a signal representing a change in magnetic flux by detection of the magnetic flux from the track. Some of the multiplicity of magnetic poles on the track are opposed to the rotational reference sensor and are omitted so that a signal representing the rotational reference position is generated in the case where the angle sensor detects magnetic flux, but the rotational reference sensor fails to detect the magnetic flux.

U.S. Pat. No. 3,893,059, which issued to Nowak on Jul. 1, 1975, discloses a pulse generator with an asymmetrical multiple pole magnet. The generator comprises an asymmetrical magnet assembly and a pulse sensor that is operative for generating an electrical signal upon the application of a magnetic field thereto. The sensor and the magnet assembly are mounted for relative movement for the generation of a train of electrical signals in response to relative displacement therebetween. The asymmetrical multiple pole magnets in the magnet assembly have a plurality of asymmetrically spaced pole pairs with each pole pair including a magnetic pole of predominate plurality occupying a substantially greater area than the pole of opposite plurality.

U.S. Pat. No. 3,942,045, which issued to Palazzetti on Mar. 2, 1976, describes a speed or angle position electromagnetic transducer which comprises a permanent magnet with closely spaced pole faces and a ferromagnetic core magnetically connected to the magnet and carrying a coil. The transducer cooperates with a toothed wheel the teeth of which are moved past the pole faces and the core in such a way that two magnetic circuits are completed by the teeth, one passing through the teeth and the two pole faces and the other passing through the teeth and the core.

U.S. Pat. No. 3,835,373, which issued to Matula on Sep. 10, 1974, discloses a rotational position sensor that utilizes a Hall device and a means to maintain the Hall voltage constant. The Hall effect device is mounted within an air gap of variable size within a magnetic circuit. The Hall effect device is subjected to changes in magnetic flu density in direct relation to the rotational position of a cylindrical member forming a part of the magnetic circuit. The magnetic circuit includes a C-shaped permanent magnet having opposite pole pieces forming air gaps with the cylindrical member. The cylindrical member comprises a half cylinder in the region of the air gap containing a Hall effect device so as to vary the effective area of the gap and thus the flux density as the cylindrical member turns.

U.S. Pat. No. 3,818,326, which issued to Masuda et al on Jun. 18, 1974, discloses a rotary sensor that uses magnets for detecting the rotation of a mechanical system. The rotary sensor comprises a frame member having at least two bar yokes which are magnetically connected by a connecting yoke and a shaft member which is rotated in a space formed between the bar yokes, wherein said shaft member is provided with at least two segment yokes fixed in sequence in the lengthwise direction of the shaft. The segment yokes are arranged so that their rotating ends are deviated from each other and the bar yokes are provided with Galvano-magneto effect devices so that the devices approach the rotating ends of the segment yokes when the segment yokes are rotated.

As is well known to those skilled in the art, the output signal from a magnetically sensitive device, such as a Hall effect transducer, varies as a function of the strength and direction of a magnetic field imposed on the magnetically sensitive device. If the source of a magnetic field, such as a magnet, is moved toward the magnetically sensitive device or away from it, the strength of the magnetic field imposed on the device changes. Therefore, if a shaft position is sensed by a stationary magnetically sensitive device disposed proximate a magnet attached to the shaft, movement of the rotational axis of the shaft toward or away from the magnetically sensitive device will change the effective strength of the magnetic field imposed on the device. This change in magnetic field strength at the position of the magnetically sensitive device will therefore change the magnitude of an output signal provided by the magnetically sensitive device since the output signal is representative of the magnetic field strength imposed on the magnetically sensitive device.

This problem exists in systems for determining the angular position of a throttle shaft so that the position of a throttle plate can be determined. If the magnetically sensitive device is mounted rigidly to a stationary member and a magnet is attached to the throttle shaft, movement of the throttle shaft toward or away from the magnetically sensitive device will create inconsistent magnetic field strengths which will not accurately indicate the angular position of the throttle plate shaft and will therefore result in incorrect output signals from the magnetically sensitive device. The change in distance between the magnet and the magnetically sensitive device can be caused by wear in the bearings supporting the throttle plate shaft. In addition, variation in this critical distance between the magnet and the magnetically sensitive device can result from wobble of the throttle plate shaft as it rotates.

It would therefore be beneficial if a means for sensing the angular position of a rotatable shaft could avoid the adverse affects of bearing wear or shaft wobble.

SUMMARY OF THE INVENTION

A preferred embodiment of the present invention comprises a carrier assembly in which a magnetically sensitive device, such as a Hall effect transducer, is disposed. The carrier assembly has a portion which is shaped to receive a rotatable member in sliding association therein. The carrier assembly is pivotally attached to a housing structure to permit it to move in response to movement of the rotatable member while maintaining constant contact between the portion of the carrier assembly shaped to receive the rotatable member and a peripheral surface of the rotatable member. In addition, the present invention comprises a means for urging the carrier assembly in a direction toward the center of rotation of the rotatable member. In one embodiment of the present invention, the urging means comprises a spring which is connected to both the carrier assembly and the stationary housing structure. Within the rotatable member, a magnet is disposed and aligned so that rotation of the magnet with the rotatable member will change the polar relationship between the magnet and the magnetically sensitive device and therefore impose a varying magnetic field on the magnetically sensitive device which changes as a function of the angular position of the rotatable member.

BRIEF DESCRIPTION OF THE DRAWINGS

The present invention will be more fully understood from a reading of the Description of the Preferred Embodiment in conjunction with the drawing, in which.

DESCRIPTION OF THE PREFERRED EMBODIMENT

Throughout the Description of the Preferred Embodiment, like components will be identified by like reference numerals and letters.

Figure 1:
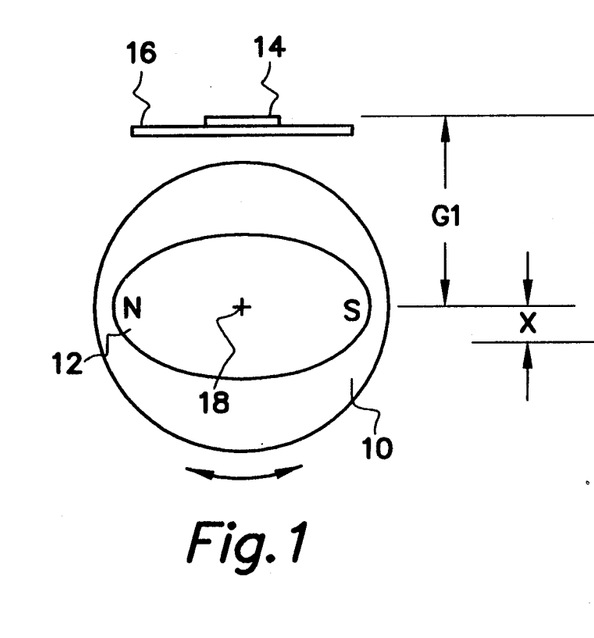
FIGS. 1 and 2 illustrate a problem associated with angular position sensors that are not made in accordance with the present invention.
Figure 2:
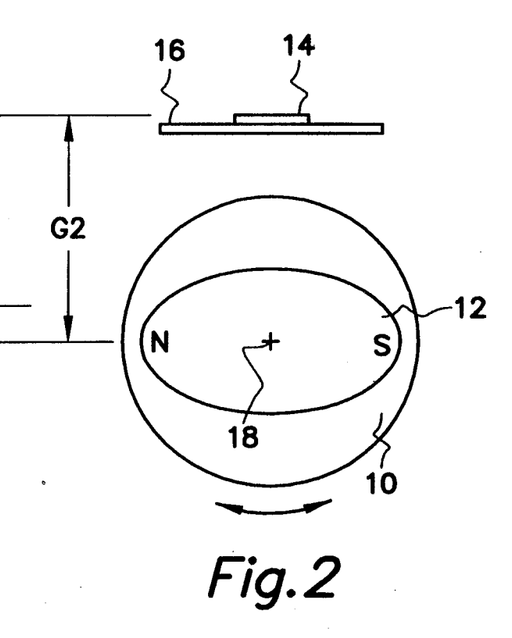

FIGS. 1 and 2 are illustrated in a side-by-side relationship to demonstrate the problem which the present invention is intended to solve. With reference to FIG. 1, a rotatable member 10 comprises a magnet 12 which has a north pole and a south pole. Although the particular shape of the magnet is not directly related to the operation of the present invention or other types of angular position sensors, the magnet 12 shown in FIG. 1 and 2 is generally ovate because of the beneficial linearity in the rate of change of the magnetic field imposed on a magnetically sensitive device in response to rotation of the rotatable member 10. A magnetically sensitive device 14, such as a Hall effect transducer, is attached to a suitable substrate 16 and disposed proximate the rotatable member 10 with the magnetically sensitive device 14 disposed at a distance G1 from the center of rotation of the rotatable member 10. As the rotatable member 10 rotates about its central axis 18, the magnetic field imposed on the magnetically sensitive device 14 changes because of the relative change of positions of the north and south magnetic poles.

With reference to FIG. 2, the apparatus shown in FIG. 1 is illustrated with the central axis 18 moved away from the magnetically sensitive device 14 by a distance identified by reference letter X. This movement of the central axis 18 could possibly be caused by wear of the bearing used to support the rotatable member 10.

Figure 3:
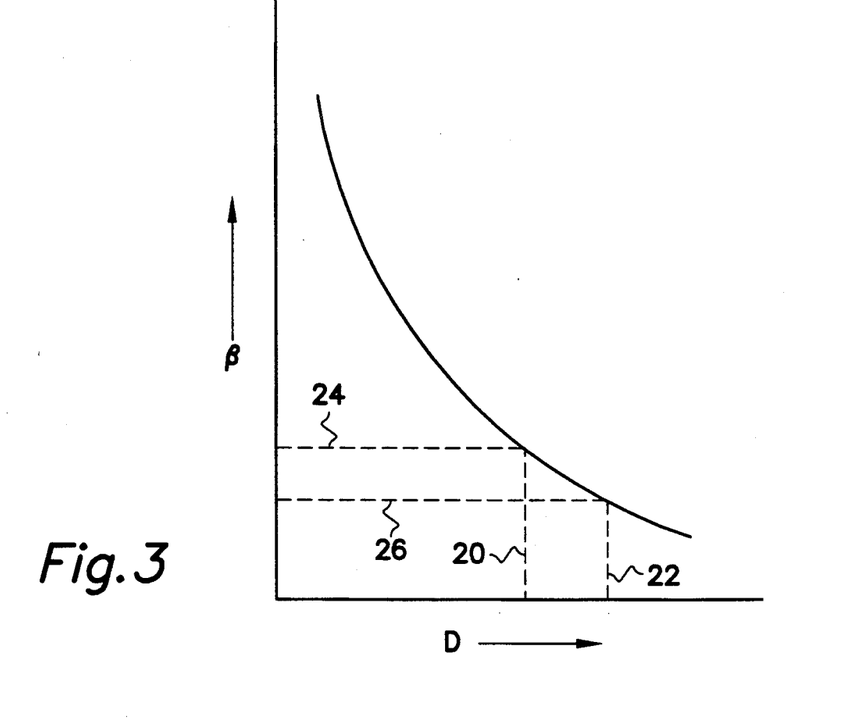
FIG. 3 shows the relationship between the strength of a magnetic field at a particular position and the distance between that position and the source of the magnetic field.

The increased distance G2 between the magnetically sensitive device and the central axis of the rotatable member results in a decrease in the magnitude of the magnetic field imposed on the magnetically sensitive device for each angular position of the rotatable member 10. FIG. 3 illustrates the relationship between the magnetic field intensity, identified as $\beta$, and the distance D between the magnetically sensitive device and a magnet used to provide the magnetic field. As can be seen, an increase in distance from line 20 to line 22 results in a decrease of magnetic field strengths from line 24 to line 26. Therefore, movement of the central axis of the rotatable member toward or away from the magnetically sensitive device will result in a change of magnetic field strength imposed on the magnetically sensitive device for any particular angular position of the rotatable member.

With reference to FIGS. 1, 2 and 3, it can be seen that a change in distance between the magnet and the Hall effect transducer will result in erroneous output signals from the Hall effect transducer because of the change in magnetic field strengths imposed on it. This type of position change of the central axis 18, regardless of its cause, will therefore be significantly deleterious and will result in incorrect information regarding the angular position of the rotatable member 10 as it rotates about its central axis 18.

Figure 4:
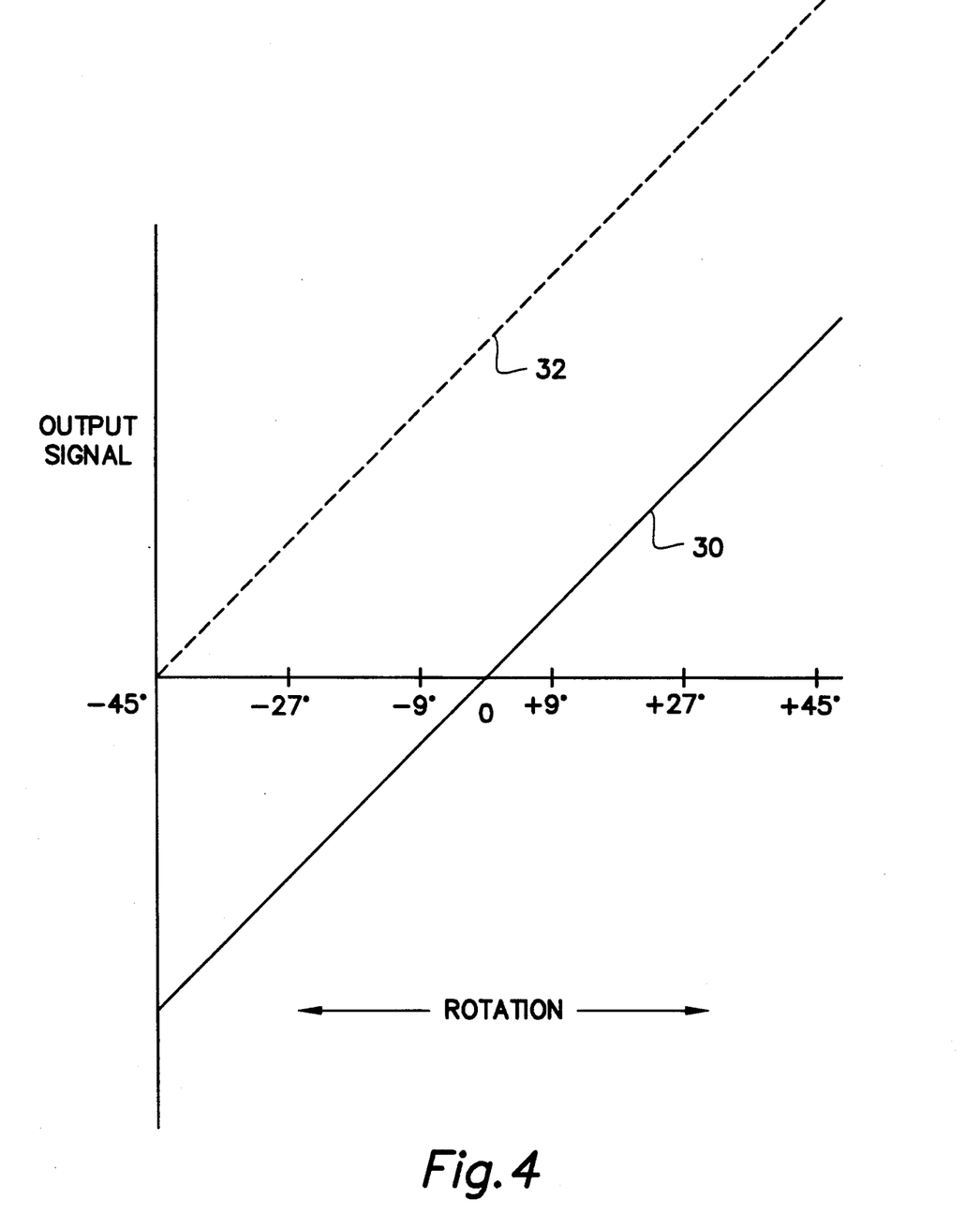
FIG. 4 shows the relationship between an output signal from a magnetically sensitive device and the angular position of a magnet attached to a rotatable member.

FIG. 4 shows an ideal linear relationship between the angular position of a rotatable member and the output signal representing the angular position of that rotatable member. The output signal, which is usually an output signal provided by a Hall effect transducer, changes as the polar relationship between the magnet and the magnetically sensitive device changes. If the relative position between the magnet 12 and the magnetically sensitive device 14 shown in FIG. 1 is assumed to be the zero degree neutral position, the relationship shown by line 30 in FIG. 4 represents the change in output signal from the magnetically sensitive device 14 as a function of the angular position of the rotatable member 10. As can be seen, counterclockwise rotation of the rotatable member 10 will result in a negative output signal from the magnetically sensitive device. If this negative signal response is undesirable, the output signal from the magnetically sensitive device can be compensated by a bias signal to result in a relationship represented by dashed line 32 in FIG. 4. It should be understood that many angular position sensors do not result in perfectly straight lines such as those shown in FIG. 4. However, for purposes of illustrating and describing the present invention, a linear relationship will be assumed between the angular position of the magnet 12 and the output signal from the magnetically sensitive device 14. It should also be recognized that a movement of the central axis 18 relative to the position of the magnetically sensitive device will result in changes in the relationships shown in FIG. 4 and will therefore result in erroneous determination of the angular position of the rotatable member.

Figure 5:
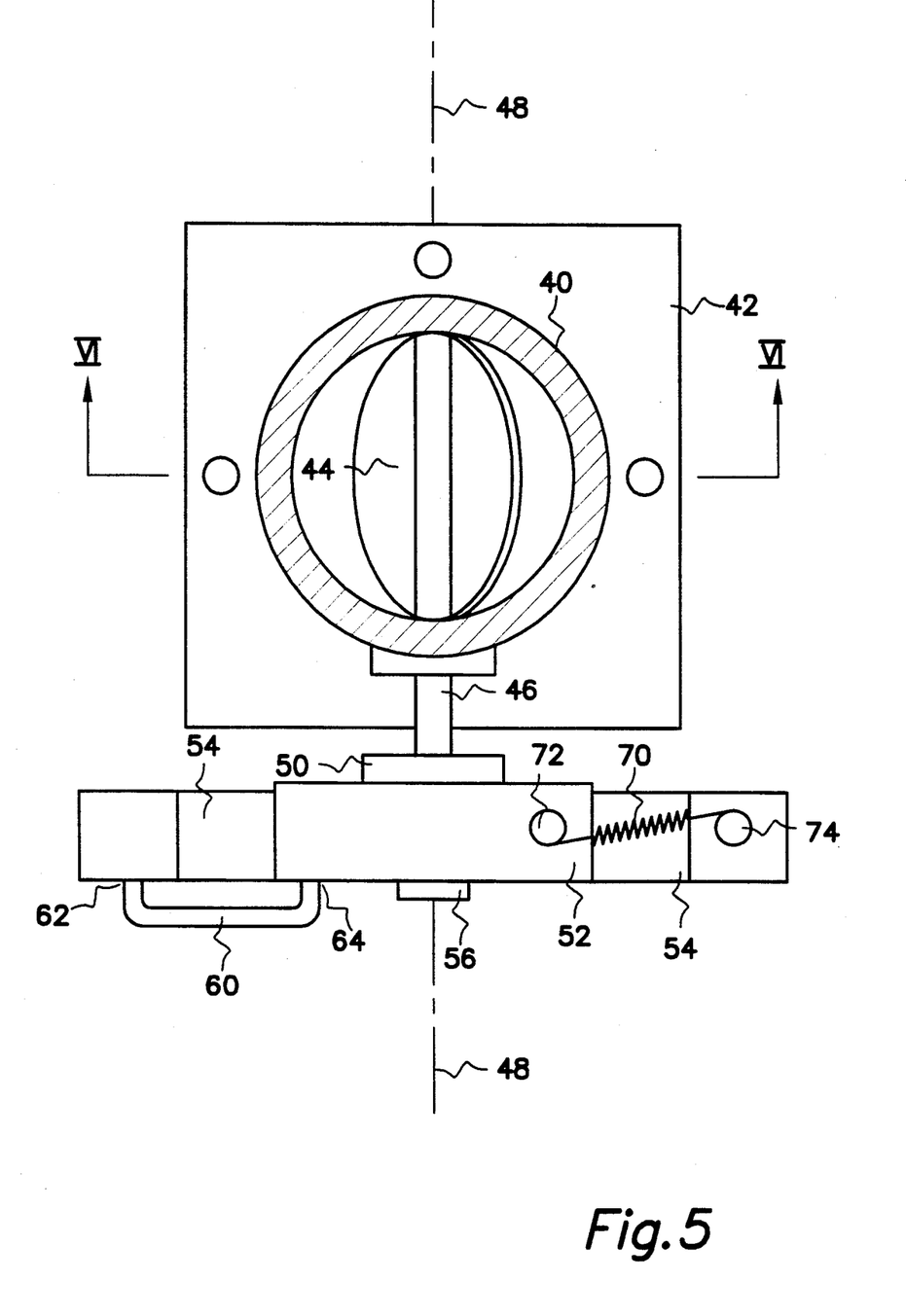
FIG. 5 shows a throttle body assembly in association with the present invention.

FIG. 5 is a highly schematic representation of a throttle body assembly with the present invention arranged to detect the position of a throttle plate within the assembly. The throttle body assembly typically comprises a cylindrical member 40 and some means for attaching the throttle body assembly to the engine of an automobile. This attachment means could comprise the base plate 42 shown in FIG. 5. Within the cylindrical member 40, a throttle plate 44 is rotatably supported and is attached to a shaft 46. If the shaft 46 is rotated about its central axis 48, the throttle plate 44 will rotate about the central axis 48 and change the effective cross sectional airflow area within the cylindrical member 40. A top view of the present invention is also shown in FIG. 5. The shaft 46 is attached to a rotatable member 50 which is disposed under and in contact with a carrier assembly 52. It should be understood that the structure identified by reference numeral 54 is a part of the stationary housing structure of either the throttle body assembly or another stationary portion of an automobile engine. The rotatable member 50 is attached to the shaft 46 and, in the illustration of FIG. 5, also comprises a shaft extension 56. The carrier assembly 52 is pivotally attached to the housing structure 54 by a bar, or pivot arm 60, that is rotatably associated with the housing structure 54 at the point identified by reference numeral 62. The pivot arm 60 is also rotatably attached to the carrier assembly 5 at the point identified by reference numeral 64. In the embodiment shown in FIG. 5, a spring 70 is used as a means for urging the carrier assembly 52 against the rotatable member 50. The spring 70 is attached to the carrier assembly at the pin identified by reference numeral 72 and is attached to the housing structure 54 by the pin identified by reference numeral 74.

Figure 6:
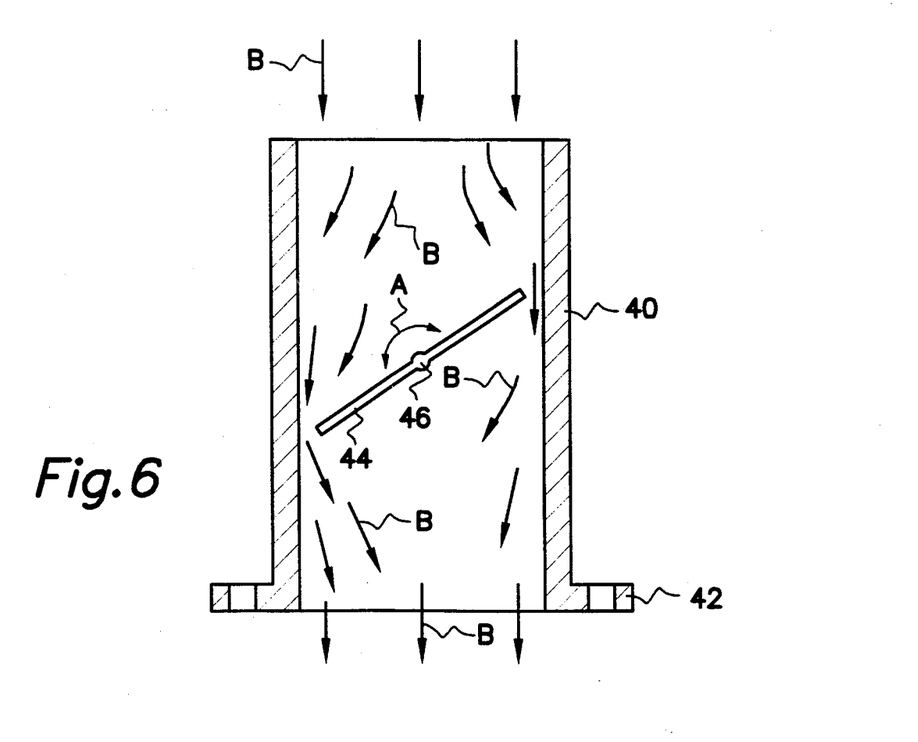
FIG. 6 shows a section view of the illustration of FIG. 5.

To more clearly illustrate the relationship between the throttle plate 44, the cylindrical member 40 and the shaft 46, FIG. 6 shows a sectional view of the assembly shown in FIG. 5. The cylindrical member 40 and the plate 42 are illustrated in cross section with the throttle plate 44 and shaft 46 supported therein. As the throttle plate 44 rotates about the central axis 48, as illustrated by arrow A, the airflow represented by the arrows B is forced to flow around the throttle plate 44 and through the restricted area within the cylindrical member 40.

In modern automobile engines, many of the control functions of the engine are dependent on accurately sensing numerous parameters regarding the operation of the engine. One of those parameters is the angular position of the throttle plate 44 within the cylindrical member 40 which is also indicative of the desired engine speed requested by the automobile operator. If the angular position of the throttle plate 44 is incorrectly determined, the speed and other control functions of the engine will be adversely effected.

Figure 7:
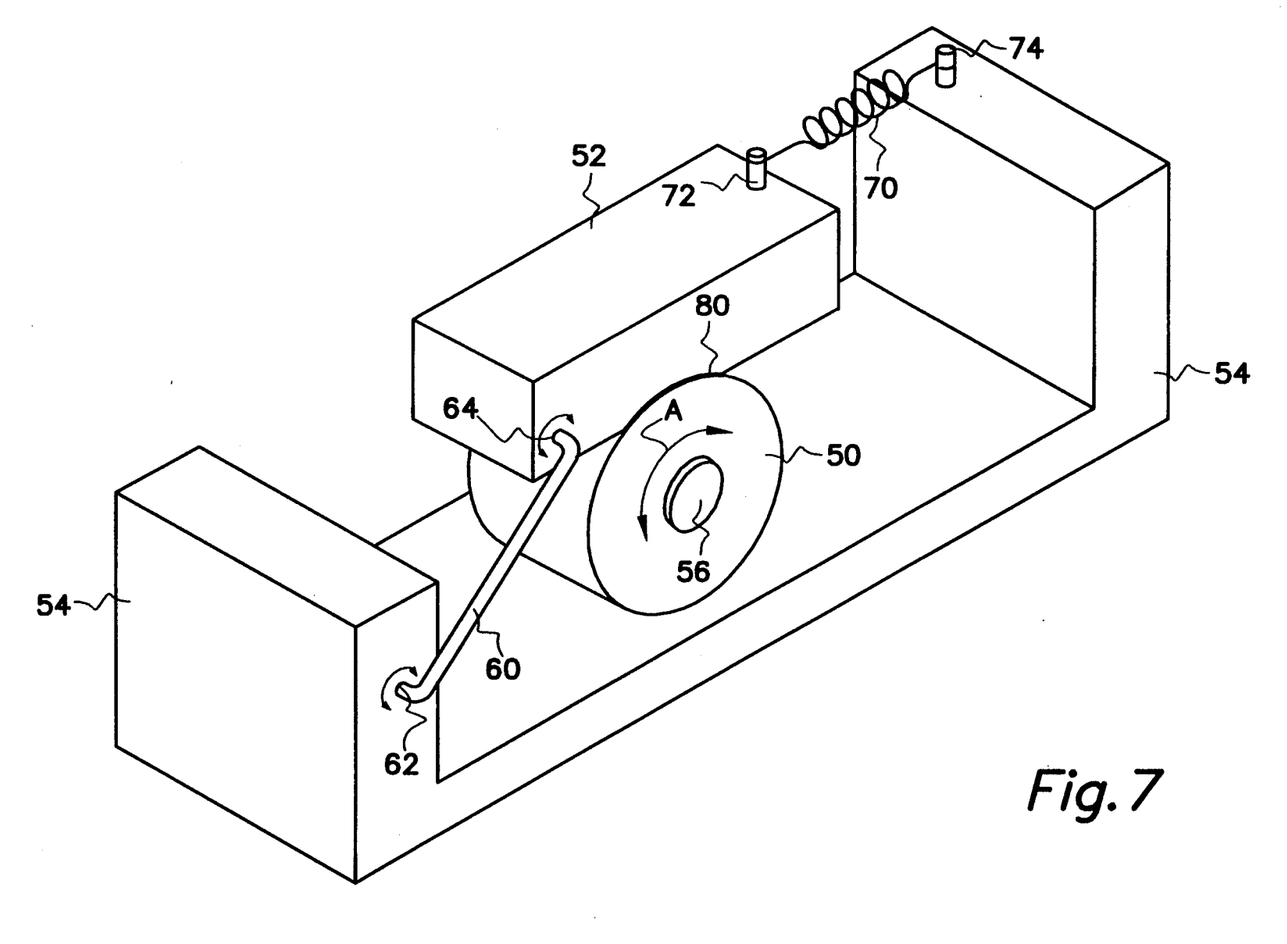
FIG. 7 shows a perspective view of the present invention.

FIG. 7 shows a perspective view of the present invention. The housing structure 54 is stationary and is a part of the throttle body assembly or, alternatively, a part of the automobile engine structure. The rotatable member 50 is attached to the shaft 46 of the throttle plate 44 (not shown in FIG. 7, but illustrated in detail in FIG. 5). The carrier assembly 52 has a portion 80 which is shaped to receive the rotatable member 50 in sliding association therein. This portion can possibly be flat, but a concave portion is preferred. As can be seen in FIG. 7, the portion 80 in a preferred embodiment of the present invention is formed by removing an arcuate segment which has a radius of curvature therein which is generally similar to the circumfrential shape of the outer surface of the rotatable member 50. This permits the carrier assembly 52 to be associated with the rotatable member 50 in sliding association. However, other shapes of portion 80 are also possible in alternative embodiments. As will be described in greater detail below, the carrier assembly 52 comprises a magnetically sensitive device therein. A pivot arm 60 is connected to both the housing structure 54 and the carrier assembly 52. Although the pivot means in FIG. 7 is a generally rigid arm, it should be understood that alternative pivot means such as a flexible conductive cable can also be used. As illustrated by the arrows at its ends, the pivot arm 60 can be rotatably associated with both the housing structure 54 at the point identified by reference numeral 62 and with the carrier assembly 52 at the point identified by reference numeral 64. This permits the carrier assembly to move in response to movement of the rotatable member 50 and maintain a constant dimension between a magnet which is disposed within the rotatable member 50 and the magnetically sensitive device which is disposed within the carrier assembly 52. It should be understood that the pivot arm could be rotatably connected at location 62, location 64 or both, depending on the particular requirements of the application. In order to maintain consistent contact between the rotatable member 50 and the carrier assembly 52, the present invention provides a means for urging the carrier assembly against the rotatable member 50 in a direction toward the central axis 48 of the rotatable member. In a preferred embodiment of the present invention, this urging means is a spring 70 which is attached to a first peg 72 of the carrier assembly 52 and a second peg 74 of the housing structure 54. The combination of the pivot arm 60 and the urging means, or spring 70, maintains a consistent and reliable contact between the portion 80 of the carrier assembly and the rotatable member 50.

Figure 8:
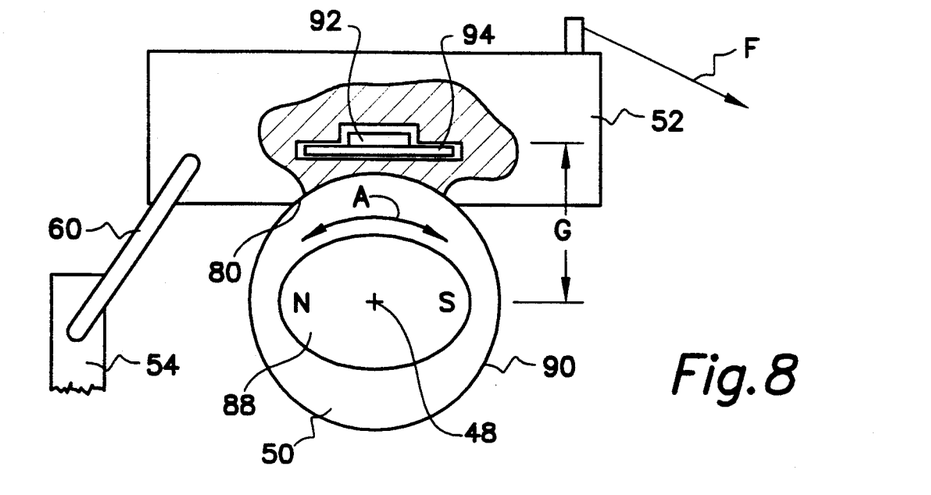
FIG. 8 shows a sectioned illustration of an embodiment of the present invention.

Although many different embodiments of the present invention are possible within its scope, FIG. 8 shows a partial section view of a particular embodiment thereof. The rotatable member 50 comprises a magnet 88 disposed therein. In a typical application, the magnet 88 can be an oval magnet as shown in FIG. 8 and the magnet can be potted permanently within the rotatable member 50. The rotatable member 50 is disposed for rotation about central axis 48 in the directions represented by arrow A. The carrier assembly 52 has a portion 80 that is shaped to receive the rotatable member 50, and particularly an outer cylindrical surface 90 of the rotatable member 50, in sliding relation therein. As can be seen by the partially sectioned portion of FIG. 8, a magnetically sensitive device 92 is disposed on a substrate 94 and the combination assembly is disposed within the carrier assembly 52. The carrier assembly 52 is pivotally associated with the housing structure 54 by pivot arm 60 as described above in conjunction with FIGS. 5 and 7. The urging means, such as the spring 70 shown in FIGS. 5 and 7, provides a force F which urges the carrier assembly 52 in a direction toward the central axis 48 in cooperation with the pivot arm 60. Therefore, if the central axis 48 were to move downward in FIG. 8 as a result of bearing wear or shaft wobble, the spring 70 would urge the carrier assembly 52 to move with the rotatable member 50 and maintain contact between the portion 80 of the carrier assembly 52 and the outer cylindrical surface 90 of the rotatable member 50. This, in turn, would maintain a consistent dimension G between the magnetically sensitive device 92 and the center of rotation of the magnet 88. As a result, the strength of the magnetic field imposed on the magnetically sensitive device 92 would be consistent for every angular position that the rotatable member 50 could assume regardless of possible movement of the axis 48.

With continued reference to FIG. 8, it can be seen that the distance between the magnet 88 and the magnetically sensitive device 92 is not equal to zero although it is maintained constant for each particular angular position of the rotatable member 50. Between the magnet 88 and the magnetically sensitive device 92, a portion of the rotatable member 50 above the magnet in FIG. 8 and a portion of the carrier assembly 52 below the substrate 94 in FIG. 8 separate the magnetically sensitive device 92 from the magnetic 88. If it is desirable to minimize this total distance between these components, an alternative embodiment, such as that shown in FIG. 9, can be used.

Figure 9:
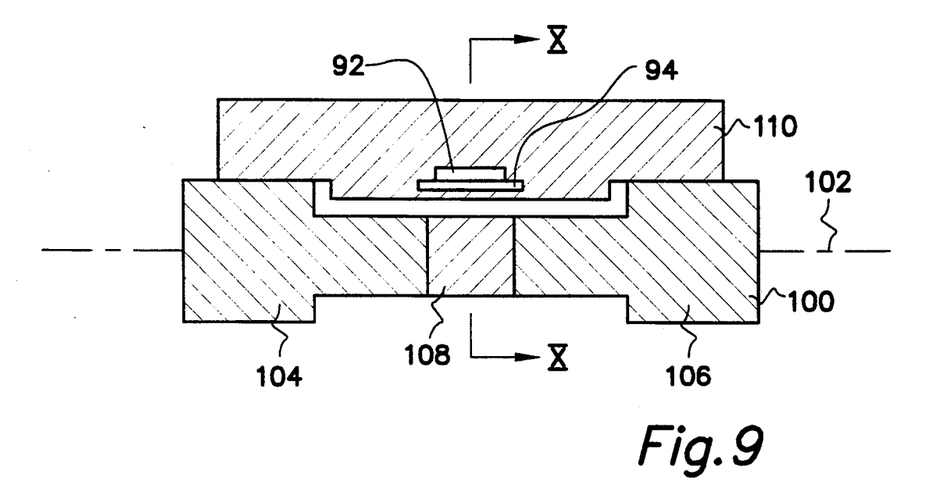
FIG. 9 shows an alternative embodiment of the present invention.

In FIG. 9, a rotatable member 100 is arranged to rotate about the central axis 102 in a manner similar to the relationship between rotatable member 50 and central axis 48 discussed above. The rotatable member 100 in FIG. 9 has two cylindrical portions, 104 and 106 which are shaped to be received in portions of a carrier assembly 110 in a way similar to the relationship between the portion 80 and the outer cylindrical surface 90 of the rotatable member 50 discussed above in conjunction with FIG. 8. However, the magnetically sensitive device 92 and the substrate 94 shown in FIG. 9 are not arranged in direct line with the rotatable members, 104 and 106. Instead, they are supported between the members in a way that permits the magnetically sensitive device 92 to be disposed much closer to the magnet 108. If the magnet 108 is ovate, as described above, the clearance between the magnet 108 and the magnetically sensitive device 92 can not be reduced to zero, but can be minimized through use of an arrangement shown such as that shown in FIG. 9. On the other hand, if a generally cylindrical magnet 108 is used in association with the arrangement shown in FIG. 9, the clearance shown between the magnet and the magnetically sensitive device 92 can be reduced significantly more.

Figure 10:
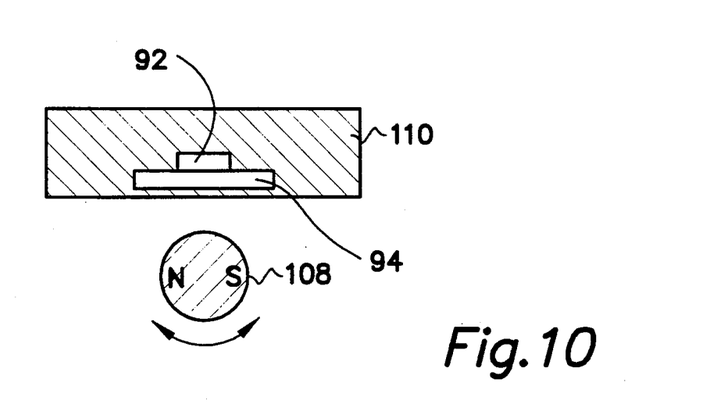
FIG. 10 illustrates a sectioned view of the illustration of FIG. 9.

FIG. 10 is a section view of the arrangement in FIG. 9. Although a gap is shown between the magnet 108 and the bottom surface of the carrier assembly 110, it should be understood that this space could virtually be eliminated in the embodiment of FIGS. 9 and 10 when a circular magnet is used.

Although the present invention has been described in specific detail and illustrated to shown a particularly preferred embodiment, it should be understood that alternative embodiments are also within its scope.

The embodiments of the invention in which an exclusive property or right is claimed are defined as follows:

1. A device for determining the position of a rotatable member, comprising:
   means for causing a magnetic field to rotate with said rotatable member, said rotatable member being rotatable relative to a housing structure;
   a magnetically sensitive device disposed in a carrier assembly, said rotatable member being disposed in rotatable association with said carrier assembly, said carrier assembly having a portion shaped to receive said rotatable member in sliding association therein, said magnetically sensitive device being disposed within effective magnetic range of said causing means to sense a magnitude of said magnetic field in a predefined direction;
   pivot means, attached to said housing structure and to said carrier assembly, for permitting said carrier assembly to rotate relative to said housing structure; and
   means, in contact with said carrier assembly, for urging said carrier assembly against said rotatable member.

2. The device of claim 1, wherein:
   said magnetically sensitive device has an output for providing a signal representative of the effective strength of said magnetic field imposed on said magnetically sensitive device.

3. The device of claim 1, wherein:
   said magnetically sensitive device is a Hall Effect transducer.

4. The device of claim 1, wherein:
   said causing means comprises a magnet assembly attachable to said rotatable member, said magnet assembly having at least one magnet rigidly disposed therein.

5. The device of claim 1, wherein:
   said pivot means is rotatably attached to said carrier assembly.

6. The device of claim 1, wherein:
   said urging means is a spring attached to said housing structure and to said carrier assembly.

7. The device of claim 1, wherein:
   said carrier assembly is movable in a direction radial to a center of rotation of said rotatable member in response to movement of said center of rotation of said rotatable member.

8. The deice of claim 1, wherein:
   said rotatable member is a shaft of a throttle plate of an automobile engine.

9. The device of claim 8, further comprising:
   a throttle body assembly, said shaft being rotatably associated with said throttle body assembly.

10. A device for determining the position of a rotatable member, comprising:
    means for causing a magnetic field to rotate with said rotatable member, said rotatable member being rotatable relative to a housing structure;
    a magnetically sensitive device disposed in a carrier assembly within effective range of said causing means to sense a magnitude of said magnetic field in a predetermined direction, said carrier assembly having a portion shaped to receive said rotatable member in rotatable and sliding association therein, said magnetically sensitive device having an output for providing a signal representative of the effective strength of said magnetic field imposed on said magnetically sensitive device;
    pivot means, attached to said housing structure and to said carrier assembly, for permitting said carrier assemble to rotate about a point on said housing structure; and means, in contact with said carrier assembly, for urging said carrier assembly against said rotatable member.

11. The device of claim 10, wherein:

said magnetically sensitive device is a Hall Effect transducer.

12. The device of claim 11, wherein:

said causing means comprises a magnet assembly attachable to said rotatable member, said magnet assembly having at least one magnet rigidly disposed therein.

13. The device of claim 12, wherein:

said pivot means is rotatably attached to said carrier assembly.

14. The device of claim 13, wherein:

said urging means is a spring attached to said housing structure and to said carrier assembly.

15. The device of claim 14, wherein:

said carrier assembly is movable in a direction radial to a center of rotation of said rotatable member in response to movement of said center of rotation of said rotatable member.

16. The device of claim 15, wherein:

said rotatable member is a shaft of a throttle plate of an automobile engine.

17. The device of claim 16, further comprising:

a throttle body assembly, said shaft being rotatable associated with said throttle body assembly.

18. A device for determining the position of a rotatable member, comprising:

a magnet attached to said rotatable member;

a magnetically sensitive device;

a carrier assembly having a portion shaped to receive said rotatable member in sliding contact therewith, said rotatable member being rotatable relative to said carrier assembly, said magnetically sensitive device being disposed within said carrier assembly, said portion being disposed in contact with said rotatable member, said rotatable member being attached in rotating association to a housing structure;

a pivot arm attached in rotating association with said carrier assembly and with said housing structure; and a resilient member attached to said carrier assembly and to said housing structure to urge said carrier assembly against said rotatable member.

19. The device of claim 18, further comprising:

an automobile throttle body assembly having a rotatable throttle plate shaft, said shaft being attached to said rotatable member.

20. The device of claim 18, wherein:

said magnetically sensitive device is a Hall Effect transducer.

* * * * *